(12) United States Patent
Bozak et al.

(10) Patent No.: US 8,713,556 B2
(45) Date of Patent: Apr. 29, 2014

(54) VIRTUAL APPLIANCE UPDATE METHOD

(75) Inventors: Erol Bozak, Vinzentiusstrasse (DE); Alexander Gebhart, Akazienweg (DE)

(73) Assignee: SAP AG, Walldorf (DE)

( * ) Notice: Subject to any disclaimer, the term of this patent is extended or adjusted under 35 U.S.C. 154(b) by 927 days.

(21) Appl. No.: 12/037,060

(22) Filed: Feb. 25, 2008

(65) Prior Publication Data

US 2009/0217244 A1    Aug. 27, 2009

(51) Int. Cl.
*G06F 9/44*    (2006.01)
(52) U.S. Cl.
USPC .......................................... 717/170; 717/171
(58) Field of Classification Search
USPC ............................................................. 717/170
See application file for complete search history.

(56) References Cited

U.S. PATENT DOCUMENTS

| | | | |
|---|---|---|---|
| 6,401,239 B1 * | 6/2002 | Miron | 717/173 |
| 6,775,830 B1 * | 8/2004 | Matsunami et al. | 717/176 |
| 6,880,157 B1 * | 4/2005 | Havemose | 719/316 |
| 7,073,172 B2 * | 7/2006 | Chamberlain | 717/169 |
| 7,107,329 B1 * | 9/2006 | Schroder et al. | 709/221 |
| 7,350,205 B2 * | 3/2008 | Ji | 717/172 |
| 7,389,505 B2 * | 6/2008 | Berenberg et al. | 717/172 |
| 7,620,948 B1 * | 11/2009 | Rowe et al. | 717/171 |
| 7,657,885 B2 * | 2/2010 | Anderson | 717/170 |
| 7,814,495 B1 * | 10/2010 | Lim et al. | 718/104 |
| 7,818,736 B2 * | 10/2010 | Appavoo et al. | 717/168 |
| 2007/0294676 A1 * | 12/2007 | Mellor et al. | 717/139 |
| 2009/0217263 A1 * | 8/2009 | Gebhart et al. | 718/1 |

* cited by examiner

*Primary Examiner* — Don Wong
*Assistant Examiner* — Theodore Hebert
(74) *Attorney, Agent, or Firm* — Mintz Levin Cohn Ferris Glovsky and Popeo, P.C.

(57) ABSTRACT

Methods and apparatus, including computer program products, are provided for updating virtual appliances. In one aspect, there is provided a computer-implemented method. The method may include receiving, under the control of a first update manager of a first virtual appliance, a second virtual appliance including a second update manager. The second virtual appliance may be received as an update to replace the first virtual appliance. Control of the update may be transferred from the first update manager to the second update manager, when the first update manager receives an indication representing completion of the update. Related apparatus, systems, methods, and articles are also described.

9 Claims, 5 Drawing Sheets

VIRTUAL APPLIANCE UPDATE METHOD

FIELD

The present disclosure generally relates to virtualization technology. More particularly, the present disclosure relates to a process for updating virtual appliances.

BACKGROUND

Virtualization technology provides a mechanism for optimizing processing at a computer. Virtualization technology provides a software layer that when executed allows multiple virtual machines with, in some cases, different operating systems to run side-by-side with other virtual machines running on the same physical machine (e.g., a node, a computer, a processor, a server, a blade, and the like). The virtualization software provides a so-called "container" that wraps and isolates the virtual machine from other virtual machines. For example, in a server complex including fifty physical servers, each of which hosts its own application server, virtualization permits the server complex to instead operate with, for example, twenty-five physical servers, each of which includes virtualization software providing two virtual machines for the application servers. In both cases, fifty application servers are deployed, but with virtualization, the number of physical servers is reduced to twenty-five. Virtualization software may provide one or more of the following functions: running multiple virtual machines with different operating systems at the same time on the same physical machine; generating fully configured isolated virtual machines with a set of virtual hardware including an operating system and applications; saving, copying, and provisioning of virtual machines; and moving virtual machines from one physical machine to another physical machine for workload management.

When a virtual machine is used, the virtual machine may include an operating system. The operating system may include one or more programs, such as applications. An operating system (OS) is the program that, after being initially loaded into the computer by a boot program, manages other programs on the computer. The other programs (also referred to herein as application programs or applications) may use the operating system by making requests for services through one or more application program interfaces (APIs) of the operating system. A program (or application) may perform one or more specific functions (or tasks) directly for a user or, in some cases, another program. A virtual machine may include an operating system, such as Linux or Windows Vista, and one or more applications, such as a browser, all of which operate in the so-called "container" provided by the virtual machine.

In some cases, the virtual machine may also include some data for use by at least one of the operating system and the application. When this is the case, the virtual machine may be referred to as a "virtual appliance." The phrase "virtual appliance" refers to an example of a virtual machine that may include the application, operating system, and data (e.g., application data, configuration information, drivers, and the like) to enable simplification of the installation and the configuration process associated with running the application. An example of a virtual appliance is the MediaWiki software that powers Wikipedia, which is available as a virtual appliance. The MediaWiki appliance contains all the necessary software, including operating system, database, and MediaWiki, to run a wiki installation as a so-called "black box."

SUMMARY

The subject matter disclosed herein provides methods and apparatus, including computer program products, for updating virtual appliances.

In one aspect, there is provided a computer-implemented method. The method may include receiving, under the control of a first update manager of a first virtual appliance, a second virtual appliance including a second update manager. The second virtual appliance may be received as an update to replace the first virtual appliance. Control of the update may be transferred from the first update manager to the second update manager, when the first update manager receives an indication representing completion of the update.

The subject matter described herein may be implemented to realize the advantage of simplifying updates of virtual appliances at a physical machine. Moreover, the subject matter described herein may reduce the need to use additional software mechanisms to manage the installation and/or management of software. For example, the virtual appliance may be a self contained software package that performs the install and/or update autonomously.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
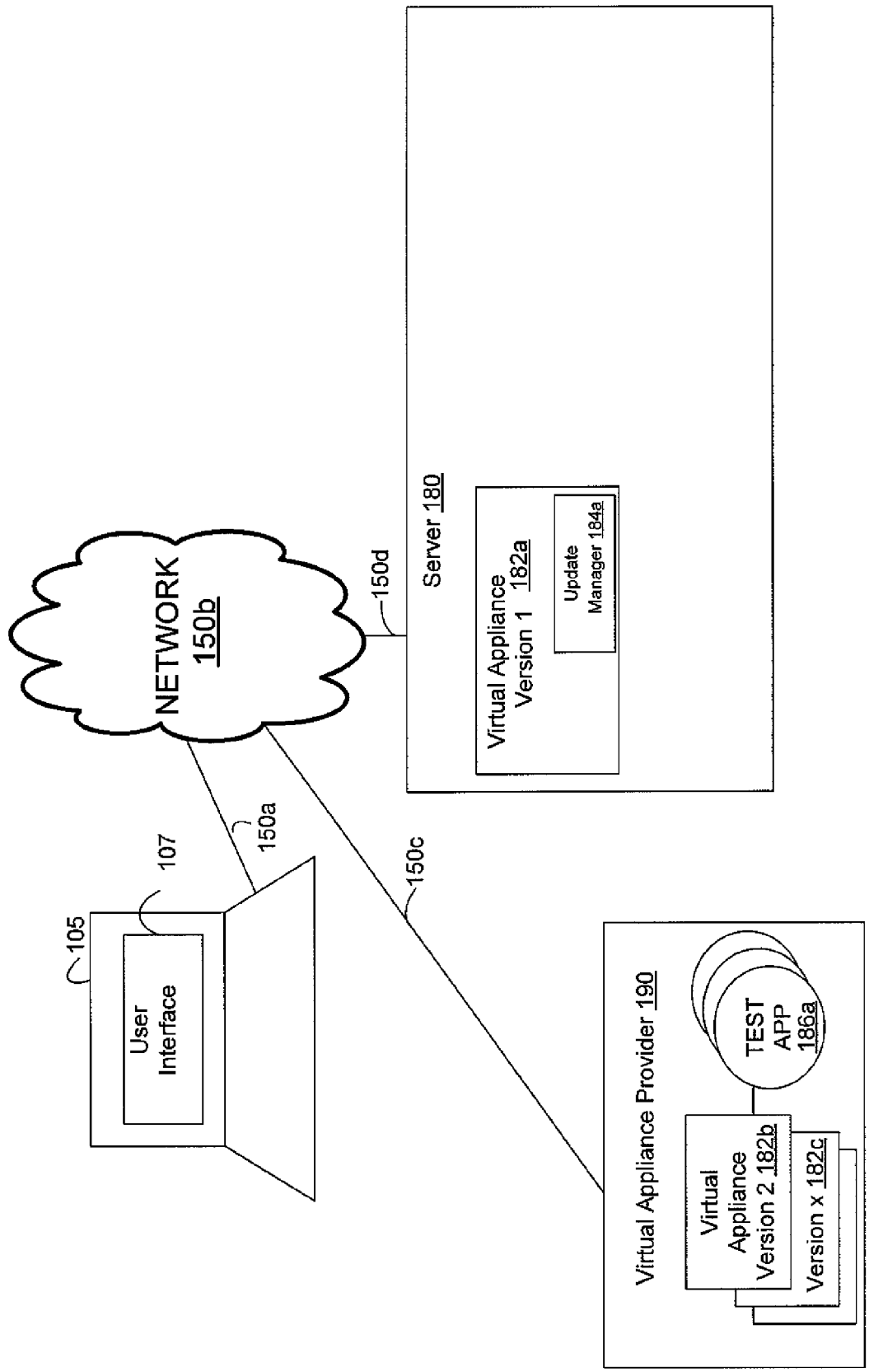
FIG. 1 depicts a block diagram of a system 100 for updating a virtual appliance using an update manager.

Like labels are used to refer to same or similar items in the drawings.

DETAILED DESCRIPTION

The subject matter described herein relates to updating a virtual appliance with another virtual appliance by providing a mechanism for a virtual appliance to be updated and tested automatically. Furthermore, the update mechanism creates an updated version of a virtual appliance including state information of the prior virtual appliance being updated. Rather than implement an update to the prior existing virtual appliance, the subject matter herein uses a separate virtual appliance (i.e., the updated virtual appliance) and the state information of the prior virtual appliance. The update mechanism uses information about the software state of the application inside the appliance being updated. An update refers to providing a replacement virtual appliance (e.g., another version, another patch, a new application, and the like).

In some implementations, the subject matter described herein may provide the benefit of not performing the update directly on the old version of the virtual appliance; instead, the update is performed on a separate, updated virtual appliance with state information from the old virtual appliance provided to the updated virtual appliance.

FIG. 1 depicts a system 100 including a computer 105, a server 180, and a virtual appliance provider 190, all of which are coupled by a network 150a-d. The computer 105 further includes a user interface 107. The server 180 includes one or more virtual appliances, such as virtual appliance 182a. Moreover, the virtual appliance 182a includes an update manager 184a for controlling the update of virtual appliance 182a.

Virtual appliance provider 190 may be implemented as a web site including one or more virtual appliances 182a-d, each of which may be selected by user interface 107. Moreover, virtual appliance provider 190 may be implemented as a processor, such as a computer, a server, a blade, or any other processor capable of executing (i.e., running) an application, such as a virtual appliance.

The virtual appliance provider 190 includes one or more virtual appliances 182b-c, some of which may be considered updates. For example, FIG. 1 depicts virtual appliance version 2 182b, which is an update to virtual appliance version 1 182a. Virtual appliance version 2 182b may be downloaded to a processor, such as server 180, and tested using a test application 186a. The virtual appliance 182a may be updated with a more recent version of the virtual appliance 182b. When this is the case, update manager 184a controls that update.

Server 180 may be implemented as one or more processors, a computer, a server, a blade, or any other processor capable of executing (i.e., running) an application, such as a virtual appliance. Moreover, the processors may each have a variety of capabilities, such as processing speed, memory capacity, storage capacity, and network bandwidth, i.e., bandwidth to and from network 150a-d). In some cases, server 180 is located at a server facility that provides computing resources (e.g., processing capacity) for hire.

User interface 107 may be implemented as any type of interface that enables interaction with aspects of system 100, including server 180, virtual appliance provider 190, test application 186a, virtual appliances 182a-c, and update manager 184a. For example, the user interface 107 may be implemented as a browser (e.g., Netscape Navigator) or a client application that performs one or more of the following functions: selects one or more virtual appliances at virtual appliance provider 190; accesses update manager 184a during an update (e.g., during process 300 or 500); presents test results; enables implementation of an updated virtual appliance, and the like.

Although virtual appliance provider 190 is depicted as separate from server 180, in some implementations, virtual appliance provider 190 may be implemented in other locations, including at server 180.

Update manager 184a may be used to control the process of updating virtual appliance 182a. For example, update manager 184a may be used to perform one or more of the following: control the update; control receipt of a virtual appliance; control testing of a virtual appliance; and handover (e.g., transfer) control to another update manager.

Network 150a-d may be any type of communications mechanism and may include, alone or in any suitable combination, intra-process communications, the Internet, an intranet, or any other communication mechanism (e.g., a telephony-based network, a local area network (LAN), a wide area network (WAN), a dedicated intranet, a wireless network, and a bus). Moreover, network 150a-d may be embodied using bi-directional, unidirectional, or dedicated communication links. Network 150a-d may also support standard transmission protocols, such as Transmission Control Protocol/Internet Protocol (TCP/IP), Hyper Text Transfer Protocol (HTTP), SOAP, WS-RM, RPC, or other protocols.

Figure 2:
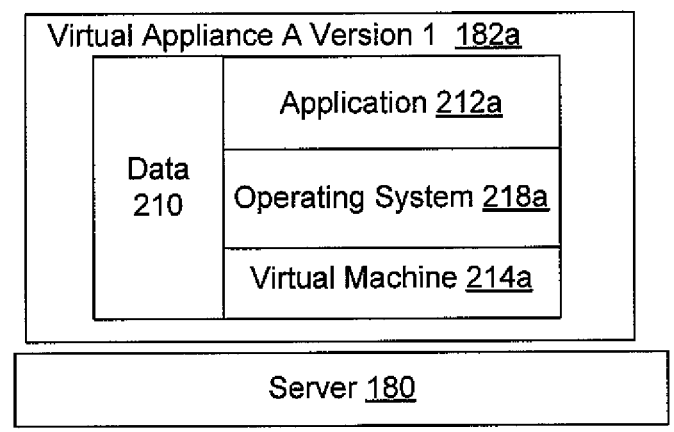
FIG. 2 depicts a block diagram of a virtual appliance.

FIG. 2 depicts an example of virtual appliance 182a. The virtual appliance 182a refers to a virtual machine 214a that includes an application 212a, an operating system 218a, and data 210 to enable configuration and/or operation of virtual machine 214. The virtual machine 214a may be implemented at a physical machine (e.g., server 180) capable of hosting one or more virtual appliances, such as virtual appliances 182a-c. Application 212a may correspond to any program, including a browser, word processing application, a customer relationship management (CRM) application, an enterprise resource planning (ERP) application, a product lifecycle management application, a supply chain management (SCM) application, a supplier relationship management application, as well as any other application. Operating system 218a may be implemented as any operating system, including Microsoft Windows, Microsoft Vista, Java, Sun OS, Linux, or any other operating system. In some implementations, virtual machine 214a is implemented as so-called a "hypervisor," which refers to a program used to manage and run the virtual machine and/or virtual appliance. The hypervisor may control (or manage) the physical machine's processor, memory, storage, network capacity, and other resources enabling the virtual operating environment. VMWare ESX and VMware Server are examples of hypervisor software for virtualizing an operating environment, including IP (Internet Protocol) addresses, registries, and other aspects normally used at a computer of a network. In some implementations, the virtual appliance also includes an update manager.

Figure 3:
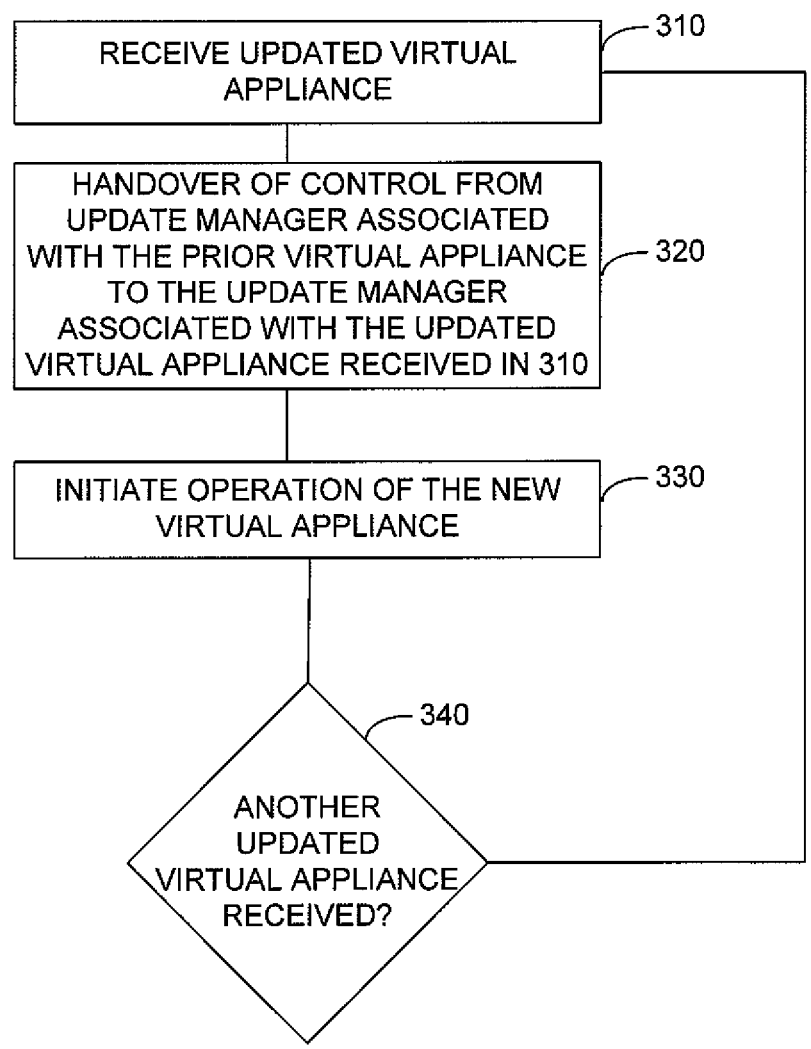
FIG. 3 depicts a process 300 for implementing an update of a virtual appliance.

FIG. 3 depicts a process 300 for updating a virtual appliance.

At 310, server 180 receives an updated virtual appliance. For example, server 180 may receive, from virtual appliance provider 190, virtual appliance version 2 182b to update virtual appliance version 1 182a. Moreover, update manager 184a may control receipt of virtual appliance version 2 182b. For example, update manager 184a may install virtual appliance version 2 182b.

Figure 4:
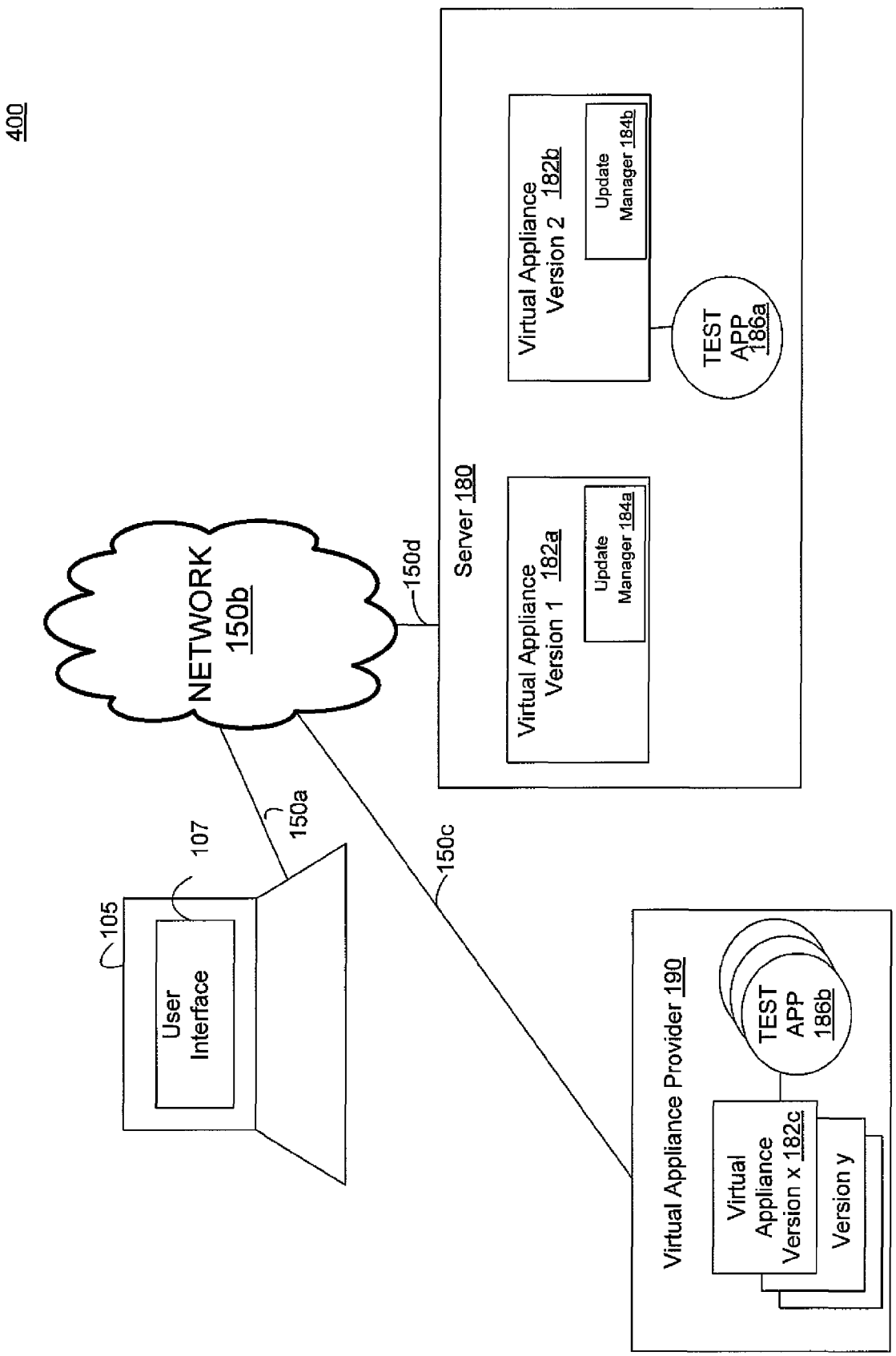
FIG. 4 depicts the system 100 with an updated virtual appliance.

FIG. 4 depicts the system 100 of FIG. 1 after virtual appliance version 2 182b has been received at server 180. In some implementations, update manager 184a may control testing of virtual appliance 182b. For example, update manager 184a may initiate testing of virtual appliance version 2 182b by sending a message to a test application 186a. Test application 186a is an application that tests whether virtual appliance 182b operates correctly. Moreover, in some implementations, update manager 184a may send a message including test results to user interface 107.

At 320, update manager 184a hands over control to update manager 184b. To hand over control, update manager 184a may send a message to update manager 184b to transfer control, which may result in a finalization of the update. Finalization refers to transferring control to the new update manager (e.g., update manager 184b). For example, the hand over can be implemented by having update manager 184a sending a message to update manager 184b to inform that the update can be finalized, at which time second update manager 184b deactivates the first appliance. Once control is handed over, update manager 184b becomes the controller responsible for controlling the update of virtual appliance version 2 182b, while update manager 184a is no longer responsible for controlling updates.

At 330, update manager 184b initiates operation of virtual appliance version 2 182b. For example, update manager 184b may send a message to the virtual appliance 182b to start. Meanwhile, update manager 184a may also terminate operation of virtual appliance version 1 182a.

At 340, update manager 184b may monitor for additional updates. When another version of a virtual appliance is received (e.g., virtual appliance version x 182c), the process 300 is repeated using update manager 184b and, when the update is complete, to hand over control to another update manager associated with the received update (e.g., virtual appliance version x 182c).

Figure 5:
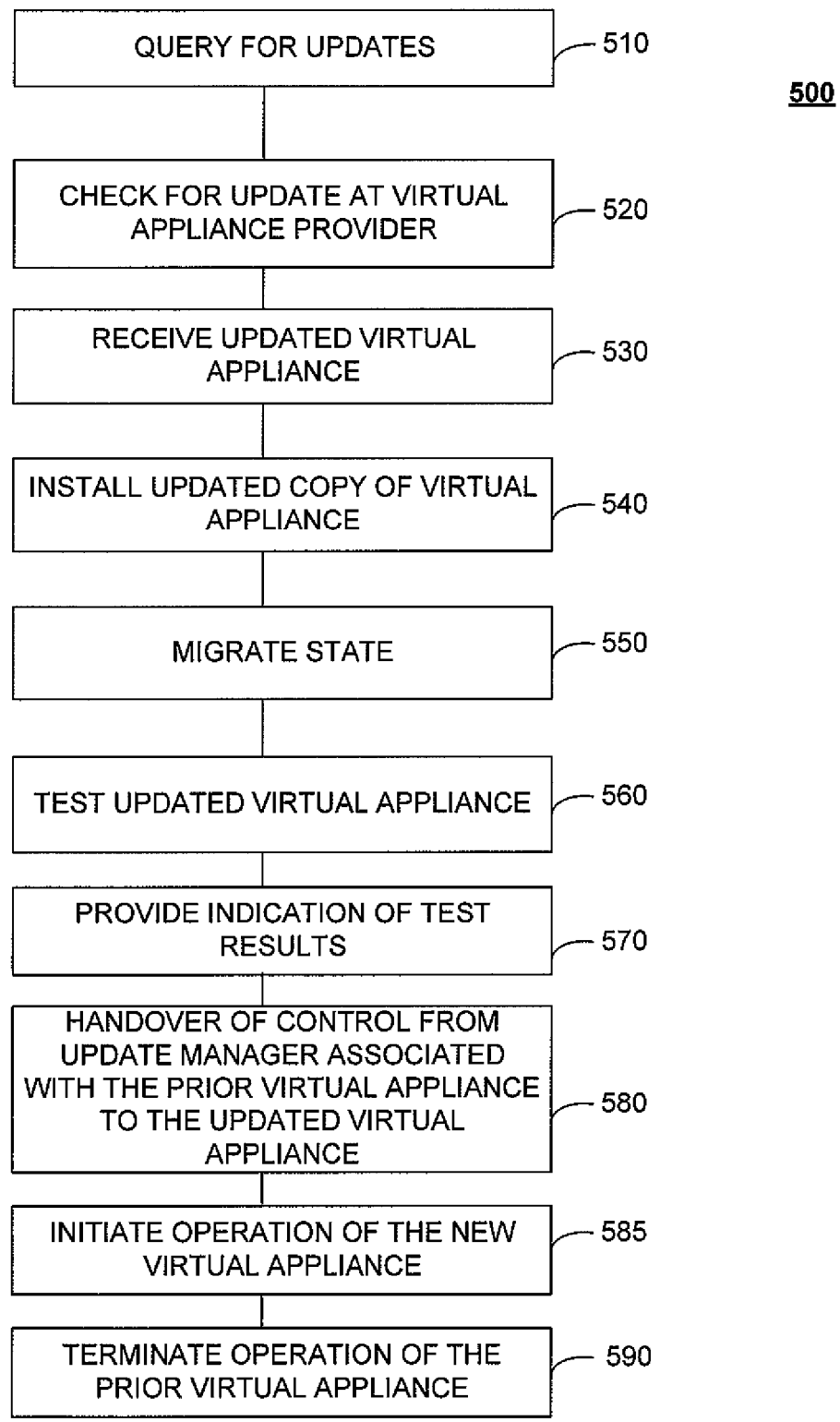
FIG. 5 depicts another process 500 for implementing an update of a virtual appliance.

FIG. 5 depicts another process 500 for updating a virtual appliance. Unlike the process 300 of FIG. 3, in the process 500, the update manager actively queries for updates.

At 510, update manager 184a periodically queries for updates to virtual appliance version 1 182a. To query, update manager 184a may send a message to virtual appliance provider 190 requesting information regarding the availability of updates. As used herein, "queries" for updates also refers to receiving a message from virtual appliance provider 190 that an update is available for use (e.g., download).

At 520, virtual appliance provider 190 may check to see if an update is available for the virtual appliance being updated. If an update is available, virtual appliance provider 190 may provide a response message indicating that an update is available, provide the location (e.g., a Uniform Resource Locator or "URL") of the update, or provide a copy of the updated virtual appliance.

At 530, server 180 receives the updated virtual appliance 182b though network 150b-d.

At 540, update manager 184a installs the received virtual appliance 182b at server 180. To install virtual appliance 182b, update manager 184a initiates execution of virtual appliance 182b.

At 550, update manager 184a provides to update manager 184b a copy of the state of virtual appliance version 1 182a. For example, update manager 184a may provide a file to update manager 184b. The file may be in an XML (extensible Markup Language) format and include information regarding virtual appliance version 1 182a, such as customer information, configuration data, semantic information, and the like. The state of a virtual appliance may include data representing customer data and/or configuration information. State migration may be necessary to make the second virtual appliance semantically similar to the first virtual appliance. The state information provided to update manager 184b is used to configure virtual appliance version 2 182b to operate in place of virtual appliance version 1 184a.

At 560, update manager 184a may initiate a test of virtual appliance 184b. For example, update manager 184a may send a message to test application 186a to test virtual appliance 184b. The test may include checks to see if virtual appliance 184b is operating properly. Testing may verify whether the new updated virtual appliance is going to operate correctly with the migrated state information from the first virtual appliance. The tests may be an execution of unit tests, self tests, or any other type of test. For example, a CRM virtual appliance my be tested by creating a customer support inquiry.

At 570, any test results may be provided to the update manager 184a, user interface 107, or a combination of the two. For example, if the test results indicate that virtual appliance 182b is operating correctly, a message may be sent to update manager 184a and user interface 107. The user interface 107 may present the test results. In some implementations, a user may select an item (e.g., an icon, check box, and the like) at user interface 107 enabling virtual appliance 182b to be used. Although user interaction may be part of the virtual appliance update processes described herein, in some implementations, the virtual appliance update may be configured to be executed automatically with little or no user interaction.

At 580, update manager 182a performs a handover of control to update manager 182b. In some implementations, when update manager 182a receives an indication that the test was successful, update manager 182a sends a message to update manager 184b to finalize the update. Once control is handed over, update manager 184b becomes the controller responsible for controlling the update of virtual appliance version 2 182b, while update manager 184a is no longer responsible for controlling updates.

At 585, update manager 184b initiates operation of virtual appliance version 2 182b. For example, update manager 184b may send a message to the virtual appliance 182b to start (e.g., execute, run, and the like).

At 590, update manager 184a may also terminate operation of virtual appliance version 1 182a. Termination refers to stopping the runtime execution of the virtual appliance. In some cases, update manager 184a may save an image (e.g., a copy) of virtual appliance version 1 182a as part of the termination.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Moreover, although the subject matter described above was described with respect to virtual appliances, the virtual appliances may be implemented as virtual machines as well.

The foregoing description is intended to illustrate but not to limit the scope of the invention, which is defined by the scope of the appended claims. Other embodiments are within the scope of the following claims.

What is claimed:

1. A non-transitory computer-readable medium containing instructions to configure at least one processor to perform operations comprising:

receiving, under the control of a first update manager of a first virtual appliance, a second virtual appliance including a second update manager, the second virtual appliance received as an update to replace the first virtual appliance, the first virtual appliance further including a first application, a first operating system, and a first data for configuring the first application, the second virtual appliance further including a second application, a second operating system, and a second data for configuring the second application;

installing, by the first update manager, the second virtual appliance;

providing, from the first update manager to the second update manager, state information representative of the first virtual appliance to enable configuration of the second virtual appliance, the state information including end-user information to configure the second application;

testing, by the first update manager using a testing application, the second virtual appliance to determine correct operation of the second virtual appliance, and receiving, by the first update manager, a result of the testing from the testing application; and transferring, based on the received test result, control by sending a handover message from the first update manager to the second update manager to enable the second update manager to terminate the first virtual appliance, when the first update manager receives an indication representing completion of the update.

2. The non-transitory computer-readable medium of claim 1, further comprising:

querying, by the first update manager, for updates to the first virtual appliance.

3. A non-transitory computer-readable medium containing instructions to configure at least one processor to perform operations comprising:

receiving, under the control of a first update manager of a first virtual appliance, a second virtual appliance including a second update manager, the second virtual appliance received as an update to replace the first virtual appliance, the first virtual appliance further including a first application, a first operating system, and a first data for configuring the first application, the second virtual appliance further including a second application, a second operating system, and a second data for configuring the second application;

installing, by the first update manager, the second virtual appliance;

providing, from the first update manager to the second update manager, state information representative of the first virtual appliance to enable configuration of the second virtual appliance, the state information including end-user information to configure the second application;

testing, by the first update manager using a testing application, the second virtual appliance to determine correct operation of the second virtual appliance, and receiving, by the first update manager, a result of the testing from the testing application; and transferring, based on the received test result, control by sending a handover message from the first update manager to the second update manager to enable the second update manager to terminate the first virtual appliance, when the first update manager receives an indication representing completion of the update, the completion triggered by the testing of the second virtual appliance.

4. A method comprising:

receiving, under the control of a first update manager of a first virtual appliance, a second virtual appliance including a second update manager, the second virtual appliance received as an update to replace the first virtual appliance, the first virtual appliance further including a first application, a first operating system, and a first data for configuring the first application, the second virtual appliance further including a second application, a second operating system, and a second data for configuring the second application;

installing, by the first update manager, the second virtual appliance;

providing, from the first update manager to the second update manager, state information representative of the first virtual appliance to enable configuration of the second virtual appliance, the state information including end-user information to configure the second application;

testing, by the first update manager using a testing application, the second virtual appliance to determine correct operation of the second virtual appliance, and receiving, by the first update manager, a result of the testing from the testing application; and transferring, based on the received test result, control by sending a handover message from the first update manager to the second update manager to enable the second update manager to terminate the first virtual appliance, when the first update manager receives an indication representing completion of the update, wherein the first update manager and the second update manager are implemented on at least one processor.

5. The method of claim 4, further comprising:

querying, by the first update manager, for updates to the first virtual appliance.

6. A system comprising:

at least one processor; and at least one memory, wherein the at least one processor and the at least one memory are configured to perform a method comprising:

receiving, under the control of a first update manager of a first virtual appliance, a second virtual appliance including a second update manager, the second virtual appliance received as an update to replace the first virtual appliance, the first virtual appliance further including a first application, a first operating system, and a first data for configuring the first application, the second virtual appliance further including a second application, a second operating system, and a second data for configuring the second application;

installing, by the first update manager, the second virtual appliance;

providing, from the first update manager to the second update manager, state information representative of the first virtual appliance to enable configuration of the second virtual appliance, the state information including end-user information to configure the second application;

testing, by the first update manager using a testing application, the second virtual appliance to determine correct operation of the second virtual appliance, and receiving, by the first update manager, a result of the testing from the testing application; and transferring, based on the received test result, control by sending a handover message from the first update manager to the second update manager to enable the second update manager to terminate the first virtual appliance, when the first update manager receives an indication representing completion of the update.

7. The system of claim 6, further comprising:
querying, by the first update manager, for updates to the first virtual appliance.

8. A method comprising:
querying, by a first update manager of a first virtual appliance, for an update comprising a second virtual appliance;

receiving, under the control of the first update manager of the first virtual appliance, the second virtual appliance including a second update manager, the second virtual appliance received in response to the querying as the update to replace the first virtual appliance, the first virtual appliance further including a first application, a first operating system, and a first data for configuring the first application, the second virtual appliance further including a second application, a second operating system, and a second data for configuring the second application;

installing, by the first update manager, the second virtual appliance;

providing, from the first update manager to the second update manager, state information representative of the first virtual appliance to enable configuration of the second virtual appliance, the state information including end-user information to configure the second application;

initiating, by the first update manager, at least one test of the second virtual appliance configured with the provided state information using a testing application to determine correct operation of the second virtual appliance;

receiving, by the first update manager, an indication of a result of the at least one test of the second virtual appliance configured with the provided state information;

transferring, based on the received test result, control by sending a handover message from the first update manager to the second update manager; and terminating the first virtual appliance, when the handover message is sent.

9. The non-transitory computer-readable medium of claim 1 further comprising:
configuring the second virtual appliance using the state information before the testing,
wherein the testing assesses whether the second virtual appliance operates correctly with the state information.

* * * * *